(12) United States Patent
Wieker et al.

(10) Patent No.: US 10,419,219 B1
(45) Date of Patent: Sep. 17, 2019

(54) SYSTEM, METHOD, AND COMPUTER-ACCESSIBLE MEDIUM FOR ACTIONABLE PUSH NOTIFICATIONS

(71) Applicant: Capital One Services, LLC, McLean, VA (US)

(72) Inventors: Jeffrey Wieker, Fairfax, VA (US); Zainab Zaki, Reston, VA (US); Clayton Johnson, Edgewood, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/154,283

(22) Filed: Oct. 8, 2018

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04L 9/32* | (2006.01) | |
| *G06F 21/62* | (2013.01) | |
| *H04L 9/08* | (2006.01) | |

(52) U.S. Cl.
CPC ............ *H04L 9/32* (2013.01); *G06F 21/6245* (2013.01); *H04L 9/0866* (2013.01); *H04L 63/0428* (2013.01)

(58) Field of Classification Search
CPC combination set(s) only.
See application file for complete search history.

(56) References Cited

U.S. PATENT DOCUMENTS

| | | | |
|---|---|---|---|
| 9,424,438 B2 * | 8/2016 | Lin | G06F 21/6263 |
| 9,473,482 B2 | 10/2016 | Koivuniemi et al. | |
| 2006/0034494 A1 * | 2/2006 | Holloran | H04L 9/32 |
| | | | 382/116 |
| 2011/0167355 A1 * | 7/2011 | Shelansky | G06F 21/41 |
| | | | 715/750 |
| 2011/0219230 A1 | 9/2011 | Oberheide et al. | |
| 2011/0238482 A1 * | 9/2011 | Carney | G06F 21/31 |
| | | | 705/14.36 |

(Continued)

OTHER PUBLICATIONS

T.R. Girill; C.H. Luk; S Norton, The Impact of usage monitoring on the evolution of an online documentation system, 1988, IEEE Explorer, vol. 18, Issue 2, pp. 326-332. (Year: 1988).*

(Continued)

*Primary Examiner* — Phy Anh T Vu
(74) *Attorney, Agent, or Firm* — Hunton Andrews Kurth LLP

(57) ABSTRACT

An exemplary system, method, and computer-accessible medium can include, for example, receiving at a first entity from a second entity, a first request for encrypted user information associated with at least one user, wherein the first request includes a user identifier associated with the at least one user, and wherein the first entity is different from the second entity, sending, from the first entity, a second request to a user device associated with the at least one user, wherein the second request includes a notification to the at least one user for an affirmation of the first request or a denial of the first request, receiving at the first entity from the user device, the affirmation or the denial, and sending, from the first entity to the second entity, (i) the encrypted user information if the affirmation is received or (ii) a denied notification if the denial is received.

16 Claims, 9 Drawing Sheets

Method (500)

(56) References Cited

U.S. PATENT DOCUMENTS

| | | | |
|---|---|---|---|
| 2012/0017266 A1 | 1/2012 | DiChiara et al. | |
| 2014/0157380 A1* | 6/2014 | Abrams | H04L 67/42 726/7 |
| 2014/0199664 A1* | 7/2014 | Sadeh-Koniecpol | G09B 5/00 434/118 |
| 2014/0250511 A1 | 9/2014 | Kendall | |
| 2016/0070758 A1* | 3/2016 | Thomson | G06F 21/6245 707/781 |
| 2017/0046758 A1 | 2/2017 | Sheehan et al. | |
| 2017/0323087 A1* | 11/2017 | Kline | G06F 21/44 |
| 2018/0005276 A1* | 1/2018 | John | G06Q 30/0269 |
| 2018/0089660 A1* | 3/2018 | Elliott | G06Q 20/223 |
| 2018/0197637 A1* | 7/2018 | Chowdhury | G16H 50/30 |
| 2018/0227301 A1* | 8/2018 | Maruyama | H04L 63/08 |

OTHER PUBLICATIONS

Daisuke Mashima, Authenticated down-sampling for privacy-preserving energy usage data sharing, 2015, IEEE Explorer, pp. 605-610. (Year: 2015).*

Abhinav Raj; R. Arunprasath; S. Vigneshwari, Efficient mechanism for sharing private data in a secured manner, Mar. 18-19, 2016, IEEEE Explorer, pp. 1-4 (Year: 2016).*

"What are you sharing when you sign in with Facebook or Google?" (2015) CBS News (https://www.cbsnews.com/news/what-are-you-sharing-when-you-sign-in-with-facebook-or-google/).

Google Identity Platform, Google Developers (https://developers.google.com/identity/).

"Connecting with People Across Apps and Bots in Messenger", ID Matching API-Facebook Login, (https://developers.facebook.com/docs/facebook-login/connecting-accounts).

"OAuth: How Does 'Login With Facebook/Google' Work?", Science ABC, (https://www.scienceabc.com/innovation/oauth-how-does-login-with-facebook-google-work.html).

"Should You Use Facebook or Google to Log in to Other Sites?", Techlicious, (https://www.techlicious.com/blog/should-you-use-facebook-or-google-to-log-in-to-other-sites/).

"Using Facebook Login with Existing Login Systems", Facebook Login, (https://developers.facebook.com/docs/facebook-login/multiple-providers/).

* cited by examiner

System 300

Method (400)

Method (500)

Method (500)

Method (500)

Method (600)

Method (700)

SYSTEM, METHOD, AND COMPUTER-ACCESSIBLE MEDIUM FOR ACTIONABLE PUSH NOTIFICATIONS

FIELD OF THE DISCLOSURE

The present disclosure relates generally to user data control, and more specifically, to an exemplary system, method, and computer-accessible medium for active control of user data through the use of push notifications to a user device.

BACKGROUND INFORMATION

A typical user has many different accounts with different entities. When a user creates an account, the user will generally provide a certain amount of personal, identifying, information regarding the user. Each entity may have, for example, different user data retention policies, different use policies, and different user data sharing policies. The policies of using user-information may further change without any notification to the user. In addition, the possessor of the user information may also change through a merger or buy-out of one entity by another, many times without any notice to the user. In addition, the more entities that a user shares their personal information with, the greater the risk of the user's information being stolen by a breach at one of the entities. Further, a user may only desire to share certain pieces of personal information with an entity for, and only for a single, limited use.

Additionally, a user may forget that an account exists at various entities, or may only desire to share his/her information with an entity for a single-use, such as a single purchase. Organizing and keeping track of user accounts is made more difficult as the number of user accounts a user has increases. This can lead to forgotten or abandoned accounts as it can be difficult for a user to keep track of all of their accounts. In addition, a user may desire to update certain information across accounts at different entities, without having to manually provide the information separately to each entity. Furthermore, a user may have different login and passwords across different entities, or risk lower security by using the same password across accounts.

Thus, it can be beneficial to provide exemplary system, method, and computer-accessible medium, which allows users to control the flow, use, and storage of user information to overcome at least some of the deficiencies described herein.

SUMMARY OF EXEMPLARY EMBODIMENTS

Embodiments of the present disclosure provide a system, method, and computer-accessible medium, which can include, for example, (i) receiving at a first entity from a second entity, a first request for encrypted user information associated with user(s), where the first request can include a user identifier associated with the user(s), and where the first entity can be different from the second entity, (ii) sending, from the first entity, a second request to a user device associated with the user(s), where the second request can include a notification to the user(s) for an affirmation of the first request or a denial of the first request, (iii) receiving at the first entity from the user device, the affirmation or the denial, and (iv) sending, from the first entity to the second entity, (a) the encrypted user information if the affirmation is received or (b) a denied notification if the denial is received.

Embodiments of the present disclosure provide a system, method, and computer-accessible medium, which can further include, any combination of, for example: (1) sending from the first entity to the second entity, decryption information used to decrypt the encrypted user information; (2) sending from first entity to the second entity an encryption request to automatically re-encrypt the encrypted user information after a particular period of time; (3) configuring the decryption information can be (i) time-based information, (ii) location-based information, (iii) hardware profile-based information, or (iv) internet protocol-based information; (4) determining a number of times the second entity has requested access to the encrypted user information; (5) sending, from the first entity to the user device, the number of times if the number of times exceeds a pre-determined threshold; (6) configuring the encrypted user information to be automatically deleted after a particular amount of time; (7) (i) receiving, at the first entity from the second entity, a first extension request to extend the particular amount of time, (ii) sending, from the first entity to the user device, a second extension request that can be based on the first extension request, wherein the second extension request includes a notification to the user(s) for a further affirmation of the first extension request or a further denial of the first extension request, (iii) receiving at the first entity from the user device, the further affirmation or the further denial, (iv) sending an extension information from the first entity to the second entity to extend the particular amount of time.

In some exemplary embodiments of the present disclosure, the exemplary system, method and computer-accessible medium can include (1) receiving, at the first entity, information related to a data breach at the second entity and sending a breach notification to the user(s); (2) initiating, at the first entity, a deletion or destruction of the encrypted user information located at the second entity based on the data breach; (3) receiving, at the first entity from the user device, a deletion request to delete the encrypted user information stored at the second entity and sending, from the first entity to the second entity, a further deletion request to automatically delete the encrypted user information; (4) receiving from the user device a deletion request to delete the encrypted user information at the first entity; (5) receiving, at the first entity from the second entity, a validation request to validate credentials of the second entity; (6) validating the credentials of the second entity and sending, from the first entity to the second entity, a validation token if the second entity's credentials are valid; (7) receiving at the first entity updated user information related to the user(s) and encrypting at the first entity the updated information; (15) comprising sending the updated user information to the second entity.

Embodiments of the present disclosure provide a system, method, and computer-accessible medium, which can include, for example, (i) receiving at a first entity from a second entity, a first request for encrypted user(s) information associated with a user(s) to be shared by the first entity with a third entity, where the first request includes a user(s) identifier associated with the user(s) and a task identifier, where the first entity, the second entity, and the third entity are different entities, (ii) sending, from the first entity, a second request to a user(s) device associated with the user(s), where the second request includes a notification to the user(s) for an affirmation of the first request or a denial of the first request, (iii) receiving at the first entity from the user(s) device, the affirmation or the denial, and (iv) sending, (a) the encrypted user(s) information from the first entity to the third entity if the affirmation is received or (b) a denied notification from the first entity to the second entity if the denial is received. Example embodiments can further include (1) configuring the task identifier to further include a task(s) to be performed by the third entity on behalf of the second entity; (2) configuring the task(s) to include of emailing, physical mailing, calling, texting, faxing, charging to a credit card, charging to a financial institution, charging to an account, reserving, pricing, delivering, or requesting feedback.

Embodiments of the present disclosure provide a system, method, and computer-accessible medium, which can include, for example (i) receiving, at a first entity from a second entity, a validation request to validate credentials of the second entity; (ii) validating, by the first entity, the credentials of the second entity; (iii) sending, from the first entity to the second entity, a validation token if the credentials are valid; (iv) receiving, at the first entity from the second entity, a first request for encrypted user information associated with a user(s), where the first request includes a user identifier associated with the user(s), and where the first entity is different from the second entity; (v) sending, from the first entity, a second request to a user device associated with the user(s), where the second request includes a notification to the user(s) for an affirmation of the first request or a denial of the first request; (vi) receiving at the first entity from the user device, the affirmation or the denial; (vii) sending, from the first entity to the second entity, (i) the encrypted user information if the affirmation is received or (ii) a denied notification if the denial is received; (viii) receiving, at the first entity from the second entity, a request for a time-limited decryption key; and (ix) sending, from the first entity to the second entity, the time-limited decryption key.

DETAILED DESCRIPTION OF EXEMPLARY EMBODIMENTS

An exemplary system, method, and computer-accessible medium can be provided which can facilitate control of specific user information that can be provided to a specific entity. For example, information regarding a user (e.g., a user's physical address, email-address, phone number, date of birth, financial information, phone number, user name) can be stored at a first entity, which can be used by the user to facilitate control of the information, which can include granting or denying access of the information of a second entity. Thus, for example, if a second entity requests access to particular user information, the first entity can provide the user with the option to provide the requested information to the second entity, or deny such a request. When a second entity requests information, the first entity can provide the user with a notification (e.g., a push notification) to accept or deny the request. For example, the second entity may request access to the user's date of birth, and the first entity can provide the user with a notification to the user's device, such as for example the user's smartphone, tablet, or computer, through a phone call, text message, notification through a dedicated smartphone application, or email, for the user to approve or deny the request for user information which originated at the second entity. The request can include a one-time access to the requested information, or the request grant perpetual access to the specific information until such time that the user removes access to that information. Thus, for example, the first entity can provide the second entity with the requested information, which can be stored at the second entity until a removal request has been received. Alternatively, the specific information can be stored only at the first entity, but the second entity may not need to request future access from the user each time access is needed (e.g., the second entity can request access to the information from the first entity, and the first entity can determine whether the user needs to be contacted for the specific requested information).

Figure 1:
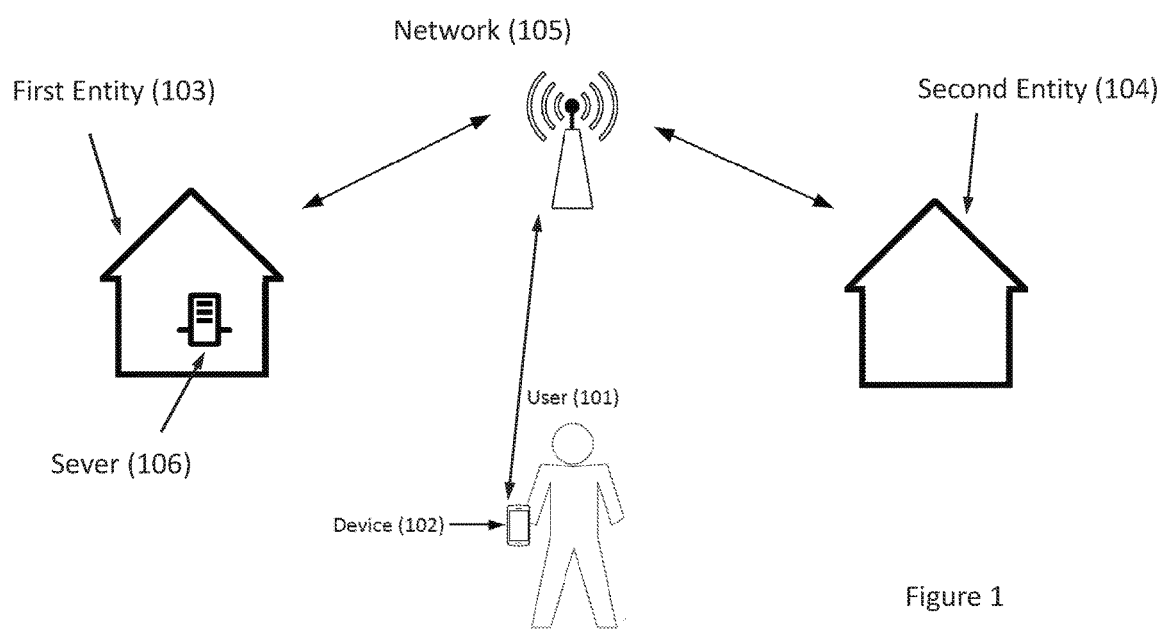
FIG. 1 is an exemplary diagram illustrating control of user data including a first entity and a second entity according to an exemplary embodiment of the present disclosure.

After access has been granted to a second entity, access can be revoked by the user. For example, the user can send a request to the first entity to revoke access by the second entity. Additionally, the first entity can monitor for data breaches at the second entity. If a data breach is detected, the first entity can notify the user of the data breach at the second entity, and provide the user with the option (e.g., through a push notification), to remove all user information at the second entity. Removal can include revoking access the information stored at the first entity, or removal can include deleting, by the first entity, the user information stored at the second entity. FIG. 1 is a schematic diagram illustrating the exemplary system, method, and computer-accessible medium, which facilitates access to user information by a second entity.

FIG. 1 is a diagram illustrating the interactions of a user, 101, a user device 102, a first entity 103, a second entity 104 (which can include one or more second entities), and a network 105. The user 101 can be possession of a network-connected user device 102. Device 102 can be a mobile phone or a smartphone. However, the user device 102 can be from any class of devices with the capability of sending and receiving messages. For example, the user device 102 can be a laptop or a personal computer. The user device 102 can be, or can include, custom designed hardware capable of receiving and sending a message. The user device 102 can further include custom designed software capable of performing the functionality described below.

The first entity 103 can be any entity that can communicate with the user device 102 through any suitable method of communication, which can include, for example, receiving and sending a message from the user device 102 as well as sending and receiving messages with a second entity 104. The first entity 103 can include a computing apparatus used to store data and communicate with device 102. The first entity 103 can include a database of user identifiers, along with user information associated with the user identifier, which can be stored on a server 106. The first entity 103 can include a single server 106 or multiple servers, computing arrangements, or storage devices.

The user 101 can, through his/her user device 102, or through any other medium, create an account or profile with the first entity 103, which can be associated with a unique user identifier. The user identifier can be any alpha-numeric string unique to the user 101. The user identifier can further append information unique to the user 101, such as a fingerprint or genetic information. The addition of this information can be used advantageously to verify his/her ownership of the user data if a password or other access key is lost or forgotten. In such a case, a truncated version of the user identifier can be used for the functions described below, while the fingerprint or other unique information be used to verify the identity of the user 101. The account or profile at the first entity 103 can store the information that the user can share with another entity. This information can be stored on, for example, a server 106. The server 106 can include one or more databases to store user information associated with a user identifier. This information can include, but is not limited to, email address, physical address, first name, last name, social security number, blood type, hair color, weight, age, date of birth, work address, membership identifiers, shopping preferences, etc. Other, non-textual information, associated with the user 101 can also be included on the server 106, such as, an image of a government-issued ID, fingerprint data, a voiceprint, etc.

The transfer of information from the user device 102 to the first entity 103 can be performed through the user device 102, or through any user interface on a suitable device capable of sending the user information. The user 101 can, for example, visit a public portal associated with the first entity 103 to create an account and provide the requested information. The user 101 can also use the user device 102 to provide the requested information through a specialized application. The user 101 can additionally encrypt his/her information with a personal encryption method, the decryption of which is unknown to the first entity 103, to further secure his/her information. In this manner, the user 101 can be assured that, although his/her information is stored on the server 106, it cannot be accessed. For example, this can be accomplished through suitable logic on the user device 102, which can encrypt the information before sending the information to the sever 106.

First entity 103 can also store user information that is associated with more than one user (e.g., one or more connected users). This can be performed in the context of shared, joint, or connected accounts between more than one user. This can be, for example, a family account (e.g., financial accounts, loyalty accounts, etc.), where multiple users from the same family can share one account with an online retailer, or can have multiple separate accounts that are linked to one another, and all accounts can have different sets of user information. For example, the connected accounts can be an account shared between spouses. The set of user information at the first entity 103 associated with the account can be associated with more than one user. Any of the users associated with the stored user information can perform actions on the stored user information described below, even if that information is in the connected account, including requesting access to the user information, granting permission to access or denying access the user information by a second entity 104, and revoking access to the user information. This can be accomplished, for example, by storing user information and linking the user information to more than one user or more than one user identifier.

A set of user information associated with more than one user can also be created, for example, by one user associating additional user identifiers with the joint user information at the first entity 103. The other users provided by the first entity 103 can receive a notification that contains a request to add them as users associated with the joint user information. The additional users can respond to the notification to add themselves as users. Additional meta-information can also be associated with the users to perform certain actions described below. For example, to share information, the approval of more than one user or a majority of users, can be required. Additional meta-information associated with user information associated with more than one user can also be used to modify the actions that a particular user is able to perform with the joint user information. For example, a user may only have the ability to grant access to joint user information, but not revoke access to the joint user information, or vice versa.

Additionally, meta-data can be associated with user information. The first entity 103 can store the user information such that each element of data has a different level of confidentiality or security associated with it. The level of confidentiality can be stored on a numerical scale from, for example, 1 to 10, where 1 corresponds to non-confidential information and 10 corresponds to the highest level of confidentiality. For example, the data, by default, can be initially stored as having the highest level of confidentiality of 10. Alternatively, the user 101 can determine the level of confidentiality he/for each piece of information. For example, the user 101 may decide that his/her email address is not confidential, and can assign a low level of confidentiality, or no confidentiality, to it. In contrast, the user 101 may assign a high level of confidentiality to his/her personal address. Meta-data may be configured to tag or mark certain types of data which may be subject to privacy laws, such as the Health Insurance Portability and Accountability Act.

In addition to the meta-data, the user 101 can further configure or set parameters as to how certain requests for data are handled. The user 101, through his/her user device 102, can provide meta-data such as a list of entities with whom the user approves the sharing of data. As described further below, the server 106 can store the preferences of the user 101 to automatically respond or modify certain requests. Such preferences can include, for example, automatically providing non-confidential or low level confidential information to the second entity 104.

A variety of procedures can be used to increase the security and protection of the storage of information at the first entity 103. The first entity 103 can store the user data based on the level of confidentiality to protect information on its servers. For example, the first entity 103 can divide the memory of the server 106 into different zones or areas, and keep data of higher confidentiality on zones that are more heavily encrypted or monitored, and keep information that is non-confidential or of a lower level confidentiality in less encrypted zones. The zones or areas can be divisions of memory or storage on a single server in one geographical area. The zones or areas can, for example, be on physically different servers, located in different geographical areas. One zone can also exist for every level of confidentiality of the data, with each zone being more heavily encrypted than the prior zone. The first entity 103 can also obfuscate the data stored so that the user data is stored in many parts throughout the memory of the server, and may only be retrievable by knowing the location of each part of the user data. Thus, even if a part of the data was accessed, it would be unintelligible to unauthorized entities attempting to access the data. The first entity 103 can also include a virtual server (e.g., a virtual server) for communicating with each second entity 104. Each virtual server can further be unique (that is, one server corresponding to a specific combination of a user 101 and a second entity 104) and in one-to-one correspondence with each combination of a second entity 104 and a user identifier. Each virtual server can also be brought into existence only when required, such as when a request for data is received by the first entity 103 from the second entity 104, and can be frozen, destroyed, or made inaccessible, by the first entity 103. In this manner, upon determination that information should no longer be accessible to the second entity 104, the first entity 103 can simply destroy the virtual server or the data accessible via the virtual server.

User data can be stored at the first entity 103 in any suitable format. The user data at the first entity 103 can be encrypted and stored in a secure format to prevent unauthorized access. Methods of encryption and minimum key length that can be used include: Key exchange: Diffie-Hellman key exchange with minimum 2048 bits; Message Integrity: HMAC-SHA2; Message Hash: SHA2 256 bits; Asymmetric encryption: RSA 2048 bits Symmetric-key algorithm: AES 128 bits; Password Hashing: Argon2, PBKDF2, Scrypt, Bcrypt. However, any suitable encryption algorithm/procedure can be used which allows the data to be secured at the first entity 103.

Various other encryption methods can also be used, which can include quantum cryptography and quantum encryption methods. For example, in quantum key distribution, it is impossible to copy data encoded in a quantum state and the very act of using or accessing the data encoded in the quantum state changes the state of that data, which can be used to detect eavesdropping during the distribution of the quantum keys or the quantum-based encrypted data. Quantum cryptography can be used to create quantum packets of user data which can only be accessed once, and which, through the act of access, are destroyed and unusable for future access. This facilitates a packet of data to only be read once.

The second entity 104 can be an entity that requests user information, but, is an entity different/distinct from the first entity 103. The second entity 104 can also be within the same legal umbrella or structure (e.g., corporate structure) as the first entity 103 but from an end-user perspective, can be a separate entity. The second entity 104 may not have the same access to the user information as the first entity 103. The second entity 104 can be a typical consumer facing institution such as a bank, merchant, online retailer, service provider, merchandizer, manufacturer, social media provider, concert promoter, or hotel chain. The second entity 104 can utilize user information associated with a user to conduct certain tasks. The second entity 104 can request, from the first entity 103, information that is not in its possession. The second entity 104 can include a computing apparatus to store data and communicate with the first entity 103.

The first entity 103, the second entity 104, and the user 101 can communicate with one another using a network 105. Network 105 can be any means, mechanism, protocol, or pathway to allow information to be transferred between the first entity 103, the second entity 104, and/or user 101, including but not limited to Wi-Fi, WLAN, RF, radio, IR, Bluetooth, cellular, near-field communication, SMS, MMS, a phone call, any combination thereof, or any other suitable architecture or system that facilitates the communication of signals, data, and/or messages. The first entity 103, the second entity 104, and the user device 102 can be in communication through a single network or a multitude of networks.

The second entity 104 can request information from the first entity 103 by sending a request for user information associated with a user identifier to the first entity 103. The request can include a user identifier. The user identifier can be an identifier provided by the first entity 103 to the second entity 104, which can be different from the internal identifier used at the first entity 103. This can be advantageously used to obfuscate how the user data is stored at the first entity 103. The user identifier can also be an identifier created by the user 101 through the user device 102. The user 101 can, for example, read on the user device 102 a list of second entities with whom the first entity 103 is capable of sharing data. The user can then select the second entities with whom the user wishes his/her user identifier to be shared. The second entity 104 will thus have the user identifier. This may be performed, for example, to facilitate transactions with second entities that are trusted by the user 101. The user can further choose to manually create and provide a user identifier specific to the second entity 104 through the user device 102. The creation of a unique user identifier, dissimilar to the identifier used at the first entity 103, can also occur automatically at the user device 102 or at the first entity 103, and can be shared with the second entity 104. The second entity 104 can possess a user identifier to request information related to the user 101 in the future. The user identifier can create a single or limited use user identifier, which can be void after a certain number of uses. When receiving a request with a single or limited use user identifier, the first entity 103 can recognize the user identifier and limit the sharing of user information.

Upon receiving the request from the second entity 104, the first entity 103 can initiate a series of steps to process the request. The first entity 103 can determine whether it is in possession of the information related to the user identifier submitted. The first entity 103 can next determine whether the second entity 104 is approved to receive any user information, and whether the second entity 104 has been blacklisted or whitelisted. The second entity 104 can be blacklisted if, for example, a security breach has ever occurred at the second entity 104. The first entity 103 can further determine if the second entity 104 is on a grey-list and if so, conditionally approve a request if the requested user data is deemed to be sufficiently non-sensitive. Other variations of business logic can be implemented at the first entity 103 to streamline and quickly process large amounts of requests for user information from a plurality of second entities in real-time.

If the first entity 103 determines that it can process the request, the first entity 103 can access its records to determine the method in which it can communicate with the user 101. The communication method may be an actionable push notification on a special application installed on the user device 102 provided or developed by the first entity 103. Other methods to communicate with the user 101 may include a text message or an email, although not limited thereto. The first entity 103 can then send a request to the user device 102 associated with the user identifier. The request can include a message asking the user to affirm or deny the request for information by the second entity 104. In addition to the request for confirmation or denial, the message can include additional information to assist the user 101 to determine whether he/she wishes to affirm the request for information made by the second entity 104. The additional information passed to the user 101 can include, without limitation, the types of information requested by the second entity 104 (such as financial, personal, or social), the purpose for which the second entity 104 desires to use the information, whether the second entity 104 intends to store the requested user information, the type of entity that the second entity 104 is classified as, and the sensitivity of the requested data. The user device 102 can further be configured to show additional information related to the second entity 104 and the history of the requests made by the second entity 104 from the first entity 103 for the user information and display that information to the user. Additionally, if particular user information which is requested by the second entity is missing from the user information stored at the first entity 103, the user 101 can provide the information through the user device 102 to add to the information stored with the first entity 103.

The user device 102 can send back to the first entity 103 a communication or message affirming the transfer of information or denying the transfer of information to the second entity 104. These responses can be sent back via the application on the user device 102. The responses can also be sent via email or text message in plain-text. The user device 102 can send the approval, along with any additional information, to the first entity 103 in a packet of encrypted information over network 105 through encrypted or unencrypted channels. The user device 102 can further send back a communication which can modify the affirmation. For example, the user device 102 can send a message affirming the transfer of some, but, not all of the subset of user information associated with the user identifier requested by the second entity 104. For example, the user device 102 can communicate that the user's credit card information or government ID will not be shared with the second entity 104. Additional parameters for the use of the information can also be encoded into the message, such as an expiration date for the second entity's access to the user information or a limit on the number of times the information can be accessed by the second entity 104.

If the user device 102 denies the request, the first entity 103 can send the second entity 104 a denial notification. The denial notification can optionally include additional information as to why the user denied the request if the user includes such information when sending the response to the first entity 103. The denial notification can also include additional information from the user, such as an inquiry as to how or for what purpose the requested information will be used.

Upon receiving the affirmation from the user device 102, the first entity 103 can encrypt and send the requested information to the second entity 104 through network 105. The first entity 103 can retrieve the user information requested on its databases. Upon retrieving the information, the first entity 103 can further secure the information for transfer to the second entity 104. The first entity 103 can secure the information via encryption. The encryption of information can be done through any suitable method, such as Triple DES, RSA public-key private-key encryption, asymmetric encryption, Blowfish encryption, Twofish encryption, Advanced Encryption Standard (AES), quantum key distribution, Honey Encryption, etc.

Upon receipt of the encrypted information, the second entity 104 can decrypt the information for one-time use. The second entity 104 can also receive a decryption key separate from the first communication of encrypted user information. However, if permitted by the affirmation received from the user device 102, the encrypted user information can reside with the second entity 104. This can be accomplished by storing the encrypted information on, for example, servers in possession of the second entity. The encryption can allow for the parameters provided by the affirmation to be implemented. For example, the data can be encrypted in a manner that requires a new key to be requested from the first entity 103 each time the information is decrypted. In this manner, the first entity 103 can keep track of and ensure that the information is not accessed in a manner inconsistent with the parameters provided by the user 101. Additionally, the information may only be accessible for a certain period time (e.g. five minutes or an hour) before being automatically re-encrypted. Further, the information may only be accessible until an expiration time. For example, the information can be encrypted in a time-dependent manner such that the decryption can depend on time-based information.

Additionally, security can be increased through the use of token authorization. The first entity 103 can send a validation request to the second entity 104, receive information from the second entity 104, and if validated, send a validation token back to the second entity 104. The validation token can be based on a pre-determined token agreed upon by the first entity 103 and the second entity 104, or the token can be a dynamic token based on an algorithm that can be secret and known only to the first entity 103 and the second entity 104. The algorithm can include live parameters independently verifiable by both entities, such as the temperature at a particular location or the time. Upon receiving the validation token, the first entity 103 can test the token to verify the identity of the second entity 104. Upon approval of the token, the first entity 103 can send user information to the second entity. If the validation fails, the first entity 103 can request another validation token, or can take other actions, such as deleting the information accessible by the second entity 104 or refusing to share additional user information with the second entity 104.

The requested user information can also be sent to a physical server that is accessible to both the first entity 103 and the second entity 104. The physical server can be configured to monitor the encryption, decryption, and access of user information. The information can be accessed by the second entity 104 and re-encrypted by the first entity 103 to meet the parameters set in the affirmation message received by the first entity 103 from the user device 102.

The user information can also be stored on a virtual server, hosted on a physical server entirely in the control of the first entity 103. A virtual server can mimic dedicated server functionalities. Rather than implement multiple dedicated servers, several virtual servers may be implemented on one server. Each virtual server can be designated a separate OS, software and independent reboot provisioning. In a virtual server environment for Web hosting, website administrators or Internet service providers (ISP) may have different domain names, IP addresses, email administration, file directories, logs and analytics. Additionally, security systems and passwords can be maintained as if they were in a dedicated server environment. Further, a virtual server can be created for every combination of second entity 104 and user identifier so that every server is in a one-to-one correspondence with a pair that includes the second entity 104 and the user identifier. The requested user information can be stored on a virtual server whose location can separately be provided to the second entity 104. This provides additional control to the first entity 103 as the first entity 103 can further monitor how the information is being used by the second entity 104. Further, when a server needs to be blocked, the first entity 103 can advantageously destroy a virtual server without affecting other second entities or users.

The requested user information can separately be sent to the second entity 104 and be stored on a physical server entirely in control of the second entity 104. The functionality required to ensure the security of data and compliance with the parameters for the use of the user information by the second entity 104 can be achieved through specialized software installed on both entities. The software can provide additional functionality to implement the additional features described below.

Further, the second entity 104 may possess software integrated with other software systems which, through the use of application programming interfaces (APIs), performs seamlessly the steps of sending and receiving a request to the first entity 103 for a user information. The software can be used to: receive, encrypt, decrypt, and access the information; monitor the access by the second entity 104; and automatically send information, either continually or at fixed intervals, to the first entity 103. The first entity 103 can optionally record the information received from the software and allow access by the user device 102 when the information is requested.

The above methods can advantageously be used to determine the number of times the second entity 104 has requested access to user information or has accessed user information it has stored. The first entity 103 can send to the user 101 the number of times the second entity 104 has requested access to the user information. This can be performed automatically when the number of times has reached or exceeded a pre-determined threshold. The user 101 can, in response to this notification, deny additional access by the second entity 104, or optionally grant an additional number of times for which the data can be accessed.

The transfer of information described above can be accomplished through a variety of methods. As explained above, virtual servers can be created on the first entity 103 to share information upon receipt of an affirmation from the user 101. The identifier of this virtual server can continuously be changed by the first entity 103 to spoof and prevent unauthorized access by the second entity 104 of the user information. The first entity 103 and the second entity 104 can share a physical server with specialized software to encrypt, decrypt, and allow limited access of decrypted information to the second entity 104.

As explained above, if permitted, the second entity 104 can store the information requested on a time-limited, or limited number of uses, basis. The decryption of information by the second entity 104 can also be modified or contingent on additional information. For example, before sending a decryption key, the first entity 103 can validate the credential(s) of the second entity 104 and send an additional validation key to the second entity 104 if the credentials are valid. The first entity 103 can increase security by requiring a hardware identifier. For example, a hardware ID (HWID) can be created based upon a set of numbers and letters that uniquely identify a physical computer in possession of the second entity 104. The HWID can be bound to certain hardware elements on the computer like Hard Disk ID, CPU ID and BIOS Info. Location-based information, or internet protocol-based information, can also be used to provide the security.

In case a data breach is detected at the second entity 104, the first entity 103 can take additional steps to secure the user information that has been shared with the second entity 104. The data breach may be reported by the second entity 104 to the first entity 103 and/or user 101, or the data breach may independently be discovered by the first entity 103. The data breach can also be reported by a user 101 and be verified by the first entity 103. If the first entity 103 detects a failed number of decryption attempts at the second entity 104 on user data stored at the second entity 104, it can deem that a breach is being attempted, and in response, additional steps can be taken (e.g., by first entity 103) to secure user data.

Upon detection of a data breach, the first entity 103 can automatically send a code to the second entity 104 to destroy the user information that has been shared and stored at the second entity 104. The first entity 103 can send an alert to the user device 102, which has previously approved the sharing of user information with the second entity 104. The user 101 can decide whether he/she desires for the particular information to be removed from second entity 104. User 101 can also request that the information be removed from the first entity 103 by responding to a notification on his/her user device 102.

The exemplary system, method, and computer-accessible medium can include various user-friendly features for controlling access to user information. For example, the user 101 can update his/her information at the first entity 103. The first entity 103 can be configured to respond to this update by, for example, sending the updated information, or a notification of what information was updated, to the second entity 104. The first entity 103 can also receive a deletion request from the user device 102 to delete the data stored at the second entity 104 or at the first entity 103. The second entity 104 can also make requests to the user 101 through such as, for example, a request to extend the time by which the second entity 104 has access to the data. The user device 102 can require that certain requested information requested be falsified or randomized each time the information is provided to or accessed by the second entity.

In addition, information may be generated by the second entity 104 by the use of the requested user information. For example, when the information is used by a second entity 104, such as a hotel, the location and duration of a hotel stay can be generated. This information may be stored separately at the second entity 104, or become part of the user information stored at the first entity 103, and may only be accessible by that particular second entity 104 and/or the user 101. The second entity 104 may encrypt this information so that the first entity 103 cannot share this information with other second entities. By doing so, the user device 102 can access information specific to their engagement with the second entity 104. This can be advantageous to the user 101 as he/she is able to access information related to the second entity 104 by accessing a single point via the first entity 103.

An exemplary system, method, and computer-accessible medium can be provided which can facilitate control of specific user information that can be provided to a specific entity which can perform tasks, functions, or services, on behalf of separate entity. For example, information regarding a user can be stored at a first entity, which can be used by the user to facilitate control of the information. Thus, for example, if a second entity desires to have a third entity conduct a service on its behalf using user information, without the second entity accessing or storing the user information, the second entity can request access to particular user information, which can be provided to the third entity. Thus, the information can be stored at the first entity and provided to the third entity, or it can be stored or accessed by the third entity which performs functions on behalf of the second entity (e.g., by granting access by the first entity). The first entity can provide the user with the option to provide the requested information to the third entity, or deny such a request. When a second entity requests information on behalf of the third entity, the first entity can provide the user with a notification (e.g., a push notification) to accept or deny the request. The request can include a one-time access to the requested information or the request grant perpetual access to the specific information until such time that the user removes access to that information. The request can include the purpose for the requested information (e.g. sending a marketing email) and can require feedback from the user for which purposes are approved. Thus, for example, the first entity can provide the third entity with the requested information, which can be stored at the third entity until a removal request has been received. Alternatively, the specific information can be stored only at the first entity, but the third entity may not need to request future access from the user each time access is needed (e.g., the second entity can request access to the information from the first entity on behalf of the third entity, and the first entity can determine whether the user needs to be contacted for the specific requested information). The user information can also be requested by a second entity on behalf of a third entity, and be stored in an encrypted form at the third entity. The information required for decryption can be provided by the first entity by submitting a request for the information.

Figure 2:
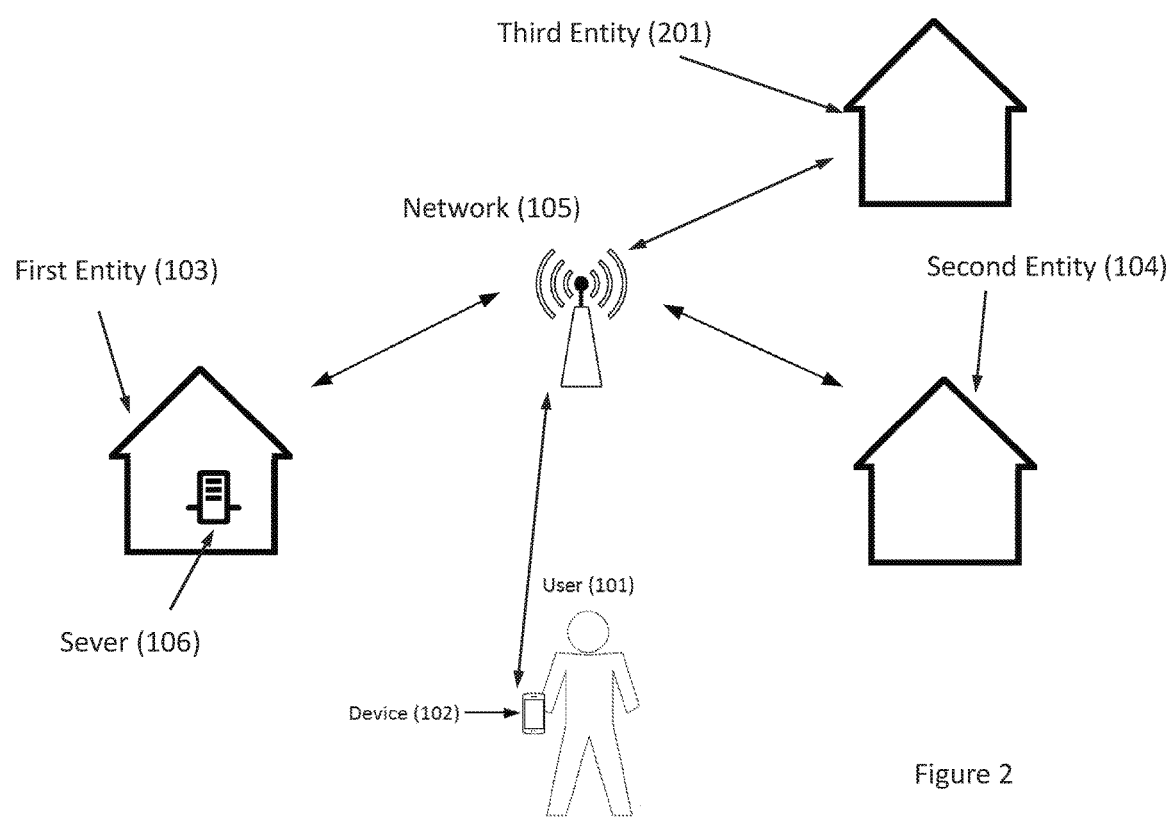
FIG. 2 is an exemplary diagram illustrating control of user data including a first entity, a second entity, and a third entity according to an exemplary embodiment of the present disclosure.

After access has been granted to a third entity, access can be revoked by the user. For example, the user can send a request to the first entity to revoke access by the second entity. Additionally, the first entity can monitor for data breaches at the second entity or the third entity. If a data breach is detected, the first entity can notify the user of the data breach at the second entity or third entity, and provide the user with the option (e.g., through a push notification), to remove all user information at the third entity. Removal can include revoking access the information stored at the first entity, or removal can include deleting, by the first entity, the user information stored at the third entity. FIG. 2 is a schematic diagram illustrating the exemplary system, method, and computer-accessible medium, which facilitates access to user information by a third entity to perform functions on behalf of a second entity.

For example, as shown in FIG. 2, the first entity 103, second entity 104, and third entity 201 can be distinct entities. Third entity 201 can possess sufficient hardware and software to process the functions described above.

As described above, the user information can be, by default, stored at the first entity. The second entity 104 may require a third entity 201 to perform certain tasks on its behalf but does not require access to the user information itself. Thus, the second entity 104 can send a request to the first entity 103 for encrypted user information associated with a user identifier and a task identifier or a function identifier, on behalf of the third entity 201. The third entity 201 can perform functions for the second entity 104, without the second entity 104 ever possessing or accessing the user data. The task identifier, or function identifier, can be a task specific to the second entity 104 or a general-purpose task commonly encountered in commerce, such as emailing, faxing, calling, physical mailing, charging a credit card, etc. The task identifier can further define the set, or sets, of information required to perform the requested task. The task identifier can further define a minimum set of information required for the task as well as the recommend set of information.

In response to the request, the first entity 103 can send a request to a user device 102 to approve or deny the request. The request can include, for example, the name of the second entity 104, the name of the third entity 201, the task requested to be performed, and the user information required to perform the task. As described above, the user device 102 can affirm or deny the request. If the user 101 affirms the request, the first entity 103 can send to the third entity 201 the requested information in an encrypted format along with suitable decryption information. If the user 101 denies the request, a notification of the denial can be sent from the first entity 103 to the second entity 104. The denial notification can also be sent to the third entity 201. Additionally, the third entity 201 can also store the user information as described above.

The exemplary system, method, and computer-accessible medium can also modify the pathway by which the first entity 103 provides information to the third entity 201. For example, the second entity 104 may first receive the user information from the first entity, transfer the user information to the third entity 201, but, require a separate key be sent from the first entity 103 to the third entity 201 to decrypt the information. Alternatively, the packet of user information can be sent to the third entity 201 directly, which can be doubly-encrypted—once encrypted with a key specific to the second entity and once encrypted with a key specific to the third entity 201, sent from the first entity 103 to the second entity 104 and third entity 201, respectively. In this manner, the second entity 104 can have to share its encryption key with the third entity 201, adding another layer of security to the process and providing the second entity 104 with a level of control as to when the requested task will be performed by the third entity 201 on behalf of the second entity 104.

Transactions typically made by a user can advantageously make use of the exemplary systems, methods, and computer-accessible mediums described above. For example, a user 101 may wish to book a hotel room. The user 101 may desire to share the user identifier with the second entity 104 at a physical location to conduct the transaction, such as a hotel lobby. For example, the user 101 can use his/her user device 102 to provide to or display to an agent of the second entity 104 a user identifier. The user identifier can be transferred in the form of a QR code on the user device 102 for the second entity 104 to scan. The user identifier can also be transferred verbally or through Bluetooth, Wi-Fi, or any other suitable medium. After scanning the QR code, or otherwise receiving the user identifier, the second entity 104 can request user information from the first entity 103. The user identifier can be transferred through any suitable application on the user device to the second entity 104, through any medium, including but not limited to Bluetooth, Wi-Fi, Near-Field Communication, Li-Fi, Infrared, and RFID.

In the request, the hotel can request, for example, the user's name, the credit card information, home address, phone number and email address, utilized for the booking to proceed, and optionally sending information related to the booking to the user 101. Further, the hotel may request that this information be available for the duration of the intended hotel stay. This request, as described above, can be sent to the first entity 103, which can send the request to the user 101 on his/her user device 102 as an actionable notification. The user 101 can see on his/her user device 102 the list of information requested, the history of past requests from the second entity 104, and the name of the second entity 104. The user can decide, for example, to grant access to the user's name, the credit card information, and home address, deny access to the phone number, and grant access to the email address. If the user 101 has not previously provided his/her email address, he/she may do at this time. The request for information can also include the time for which the hotel can access the information. Further, if during the stay, the user 101 wishes to remove access to user information, the user may submit such a request with the first entity 103 via his/her user device 102. If the user 101 decides to extend his/her stay, the hotel can request that the time for which the user information is available be extended. This can be accomplished by sending a further notification to the user device 102 for a time-extension and receiving an approval or denial from the user 101.

Methods, systems, and computer accessible mediums described herein can be advantageously used when the transfer of information to a third entity 201 is desired. For example, the hotel can later (possibly after losing access to the user data) decide to physically mail the user a coupon, but, use a third entity 201 to provide this service. In such a case, the hotel may—as described above—submit a request for the information via the first entity 103. The request can include additional information, such as a short message regarding the purpose for which the information is being requested.

Additional variations are within the scope of this disclosure. For example, the user 101 can decide that he/she does not wish to receive any commercial promotions and give a blanket rejection of such requests. In such a case, the first entity 103 can skip the step of requesting user approval and simply provide a denial to the hotel.

Figure 3:
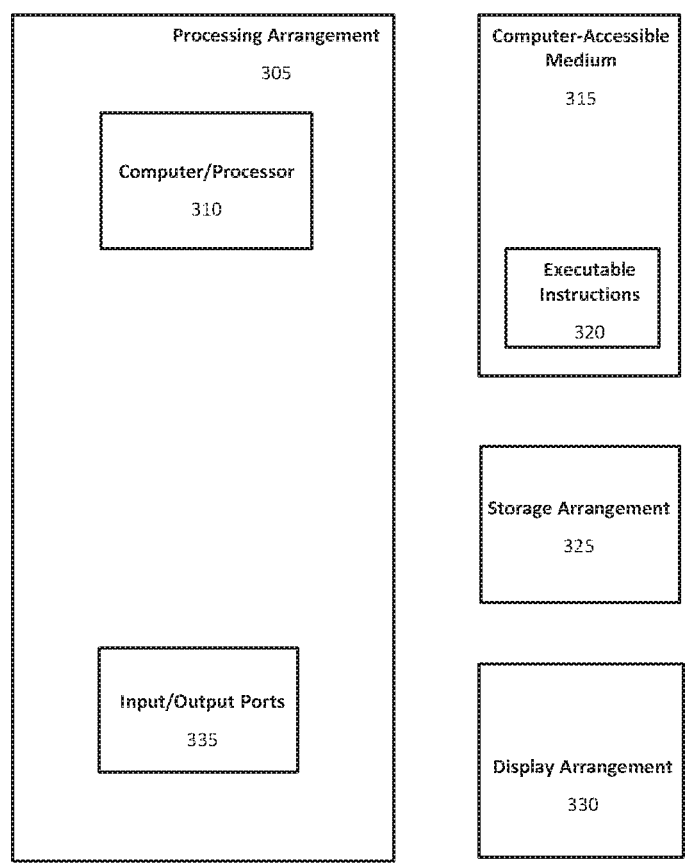
FIG. 3 is an illustration of a block diagram of an exemplary system in accordance with certain exemplary embodiments of the present disclosure.

FIG. 3 shows a block diagram of an exemplary embodiment of a system 300 according to the present disclosure, which can be used to perform the procedures described below. For example, exemplary procedures in accordance with the present disclosure described herein can be performed by a processing arrangement and/or a computing arrangement (e.g., computer hardware arrangement) 305. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 3, for example a computer-accessible medium 315 (e.g., a storage device such as a hard disk, floppy disk, memory stick, CD-ROM, RAM, ROM, etc., or a collection thereof) can be provided (e.g., in communication with the processing arrangement 305). The computer-accessible medium 615 can contain executable instructions 320 thereon. In addition, or alternatively, a storage arrangement 325 can be provided separately from the computer-accessible medium 315, which can provide the instructions to the processing arrangement 305 so as to configure the processing arrangement to execute certain exemplary procedures, processes, and methods, as described herein above, for example.

Further, the exemplary processing arrangement 305 can be provided with or include an input/output ports 335, which can include, for example a wired network, a wireless network, the internet, an intranet, a data collection probe, a sensor, etc. As shown in FIG. 3, the exemplary processing arrangement 305 can be in communication with an exemplary display arrangement 330, which, according to certain exemplary embodiments of the present disclosure, can be a touch-screen configured for inputting information to the processing arrangement in addition to outputting information from the processing arrangement, for example. Further, the exemplary display arrangement 330 and/or a storage arrangement 325 can be used to display and/or store data in a user-accessible format and/or user-readable format.

Figure 4:
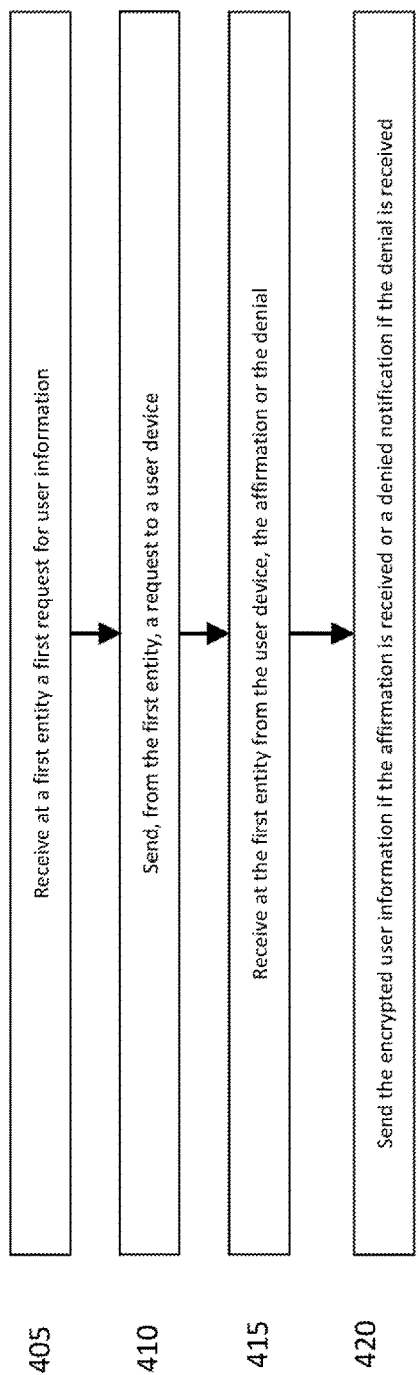
FIGS. 4 to 7 are flow diagrams of methods for secure transfer of information based on actionable push notifications according to exemplary embodiments of the present disclosure

FIG. 4 shows an exemplary flow diagram of a method 400 according to an exemplary embodiment of the present disclosure. In step 405, a first entity 103 can receive from a second entity 104, a first request for encrypted user information associated with at least one user. The information can contain additional details, as described above. At step 410, the first entity 103 can send a second request to a user device 102 associated with the at least one user. At step 415, the first entity 103 can receive from the user device 102, the affirmation or the denial. At step 420 the first entity 103 can send to the second entity 104, (i) the encrypted user information if the affirmation is received or (ii) a denied notification if the denial is received.

Figure 5A:
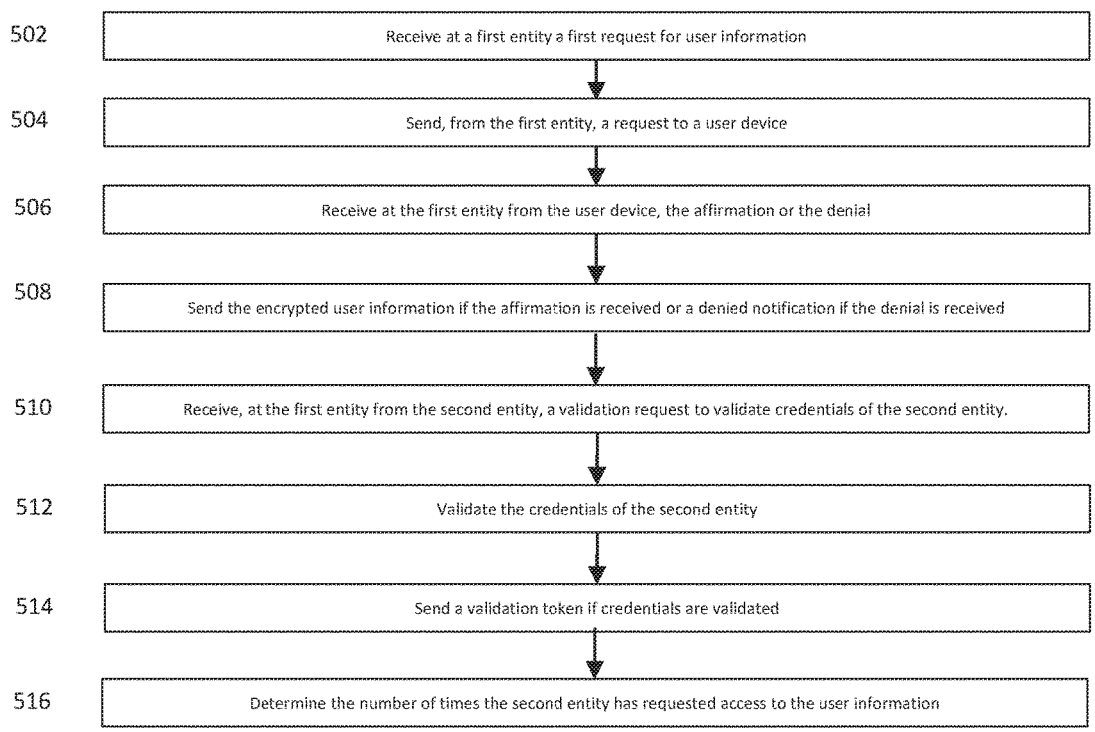
Figure 5B:
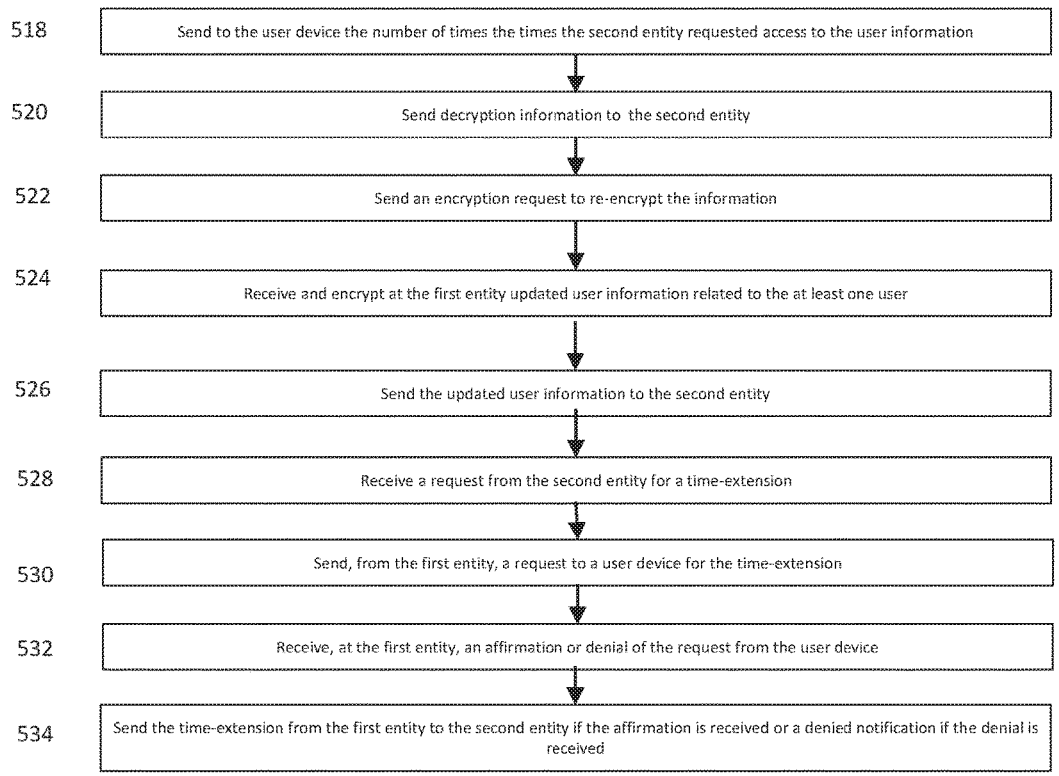
Figure 5C:
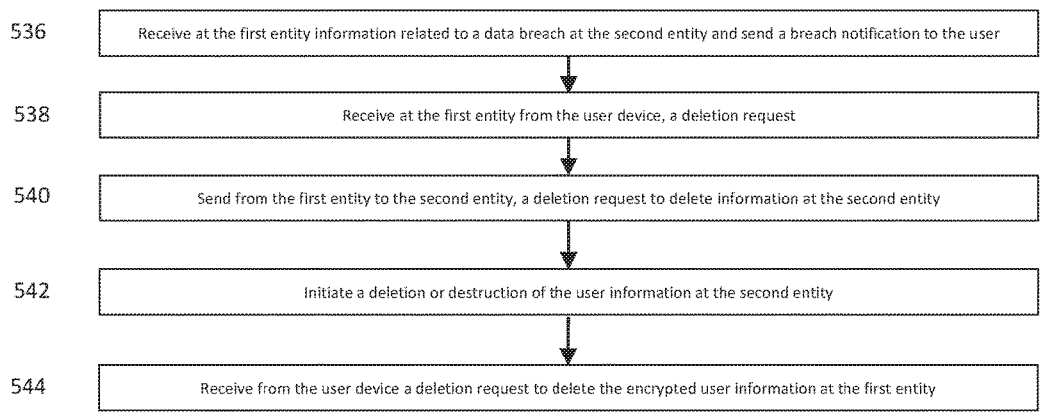

FIG. 5 describes one embodiment of the present invention, method 500. In step 502, a first entity 103 can receive from a second entity 104, a first request for encrypted user information associated with at least one user. At step 504 the first entity 103 can send a second request to a user device 102 associated with the at least one user. At step 506, the first entity 103 can receive from the user device 102, the affirmation or the denial. At step 508 the first entity 103 can send to the second entity 104, (i) the encrypted user information if the affirmation is received or (ii) a denied notification if the denial is received. At step 510 the first entity 103 can receive from the second entity, a validation request to validate credentials of the second entity 104. At step 512 the credentials of the second entity cam be validated. Step 514 of sending, from the first entity 103 to the second entity, a validation token if the second entity's credentials are valid. At Step 518 the first entity can determine a number of times the second entity has requested access to the encrypted user information. At step 520 the first entity 103 can send to the second entity 104 decryption information to decrypt the user information. At step 522 the first entity 103 can send to the second entity a request or code to re-encrypt the user information. At Step 524 the first entity 103 can receive updated user information related to the at least one user and encrypt at the first entity 103 the updated information. At step 526 the updated user information can be sent to the second entity 104. At step 528 the first entity 103 can receive from the second entity, a first extension request to extend the particular amount of time. At step 530 the first entity 103 can send to the user device 102, a second extension request that is based on the first extension request, where the second extension request includes a notification to the at least one user for a further affirmation of the first extension request or a further denial of the first extension request. At step 532 the first entity 103 can receive from the user device 102, the further affirmation or the further denial. At step 534 extension information from the first entity 103 can be sent to the second entity to extend the particular amount of time. At step 536 the first entity 103 can receive information related to a data breach at the second entity and sending a breach notification to the at least one user. At step 538 the first entity 103 can receive from the user device 102, a deletion request to delete the encrypted user information stored at the second entity. At step 540 the first entity 103 can send to the second entity, a further deletion request to automatically delete the encrypted user information. At step 542 the first entity 103 can initiate a deletion or destruction of the encrypted user information located at the second entity based on the data breach. At step 544 a first entity 103 can receive from a user device 102 a deletion request to delete the encrypted user information stored at the first entity 103.

Additionally, the method can optionally include the step of sending the decryption information used to decrypt the encrypted user information. The data may further be automatically re-encrypted or deleted after a particular period of time. Decryption may further be dependent on additional information, such as time-based, location-based, hardware profile-based, or internet protocol-based information. Other steps can include encrypting or deleting the user information after a certain period of time or when the user information is accessed beyond a pre-determined threshold.

Figure 6:
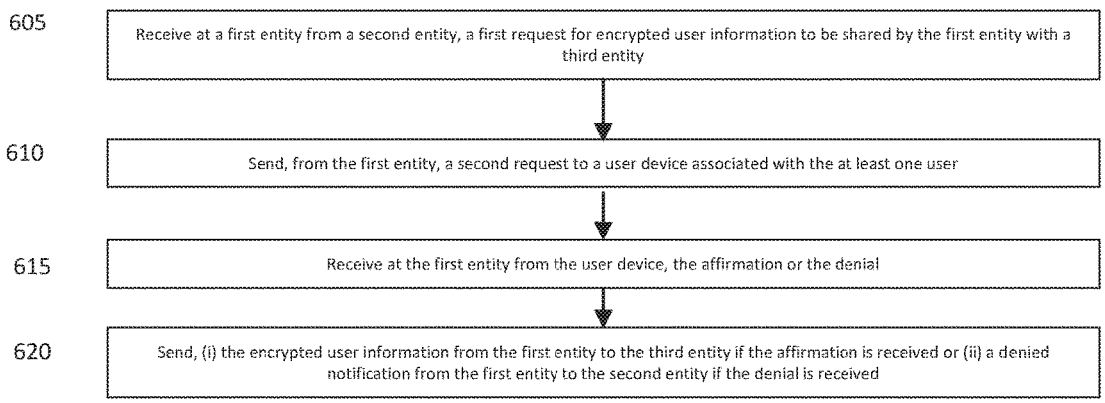

FIG. 6 describes one embodiment of the present invention, method 600. At step 605 a first entity 103 can receive from a second entity, a first request for encrypted user information associated with at least one user to be shared by the first entity 103 with a third entity 201, where the first request includes a user identifier associated with the at least one user and a task identifier, and where the first entity 103, the second entity, and the third entity 201 are different entities. At step 610 the first entity 103 can send a second request to a user device 102 associated with the at least one user, where the second request includes a notification to the at least one user for an affirmation of the first request or a denial of the first request. At step 615, the first entity 103 can receive from the user device 102, the affirmation or the denial. At step 620 the first entity can send, (i) the encrypted user information from the first entity 103 to the third entity 201 if the affirmation is received or (ii) a denied notification from the first entity 103 to the second entity if the denial is received.

Figure 7:
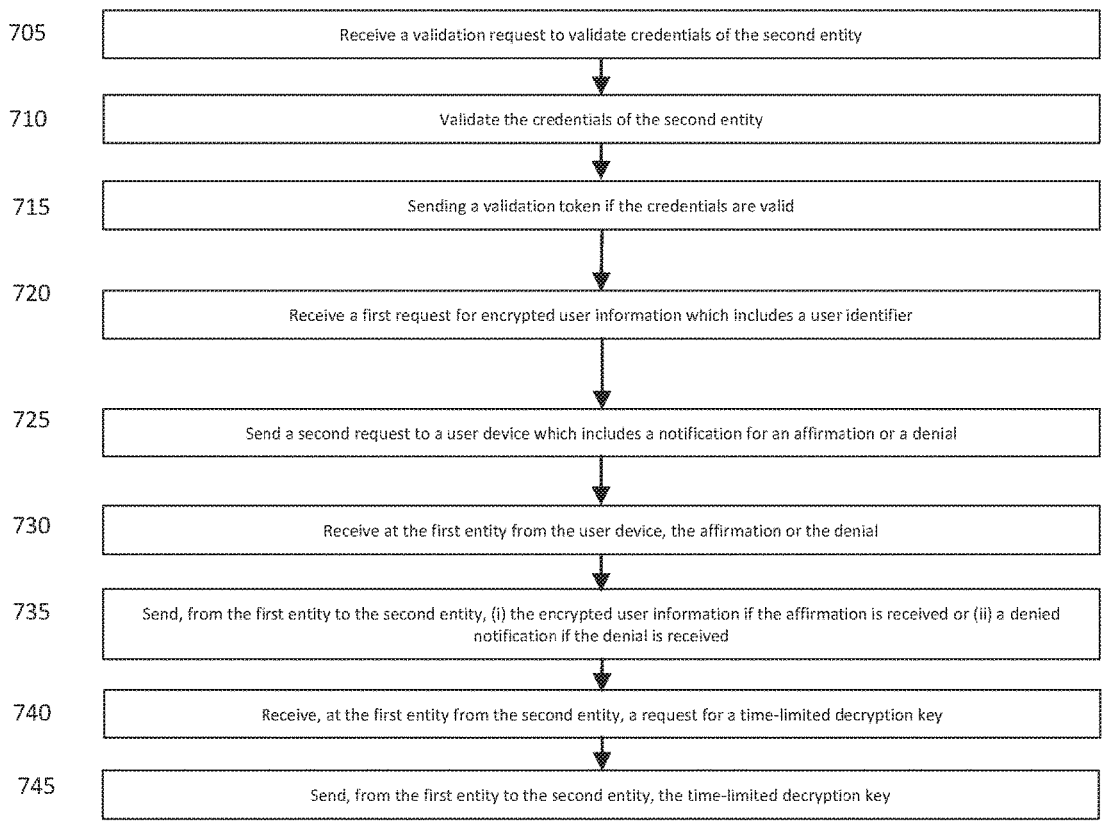

FIG. 7 describes one embodiment of the present invention, method 700. At step 705 a first entity 103 can receive from a second entity 104, a validation request to validate credentials of the second entity 104. At step 710 the first entity 103 can validate, the credentials of the second entity 104. At step 715 the first entity 103 can send to the second entity 104, a validation token if the credentials are valid. At step 720, the first entity 103 can receive from the second entity 104, a first request for encrypted user information associated with at least one user, where the first request includes a user identifier associated with the at least one user, and where the first entity 103 is different from the second entity 104. At step 725 the first entity 103 can send a second request to a user device 102 associated with the at least one user, where the second request includes a notification to the at least one user for an affirmation of the first request or a denial of the first request. At step 730 the first entity 103 can receive from the user device 102, the affirmation or the denial. At step 735 the first entity 103 can send to the second entity 104, (i) the encrypted user information if the affirmation is received or (ii) a denied notification if the denial is received. At step 740 the first entity 103 can receive from the second entity 104, a request for a time-limited decryption key. At step 745 the first entity 103 can send to the second entity 104, the time-limited decryption key.

The present disclosure is not to be limited in terms of the particular embodiments described in this application, which are intended as illustrations of various aspects. Many modifications and variations can be made without departing from its spirit and scope, as can be apparent. Functionally equivalent methods and apparatuses within the scope of the disclosure, in addition to those enumerated herein, can be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method, comprising:
  receiving at a first entity from a second entity, a first request for user information associated with at least one user, wherein the first request includes a user identifier associated with the at least one user, wherein the first entity is different from the second entity, and the user information associated with the at least one user includes a plurality of elements of data having different confidential levels;
  sending, from the first entity to the second entity, a first set of elements of data from the plurality of elements of data having a first confidentiality level below a particular confidentiality level;
  sending, from the first entity, a second request to a user device associated with the at least one user for a second set of elements of data having a second confidentiality level above the particular confidentiality level, wherein the second request includes a notification to the at least one user to authorize the first request;
  receiving at the first entity from the user device, an affirmation for the first request;
  in response to the affirmation received, sending, from the first entity to the second entity the second set of elements of data, the second set of elements of data is encrypted using quantum cryptography, and is automatically deleted after a predetermined amount of time;
  monitoring, by the first entity, usage information of the second set of elements of data at the second entity;
  detecting, at the first entity, information related to a data breach at the second entity;
  sending, by the first entity to the second entity, falsified user data in response to additional requests for the user data from the second entity after the information related to the data breach at the second entity is detected;
  sending, by the first entity, a breach notification to the at least one user;
  deleting, by the first entity, the second set of elements of data at the second entity based on the information related to the data breach detected.

2. The method of claim 1, further comprising sending, from the first entity to the second entity, decryption information used to decrypt the second set of elements of data.

3. The method of claim 2, further comprising sending from the first entity to the second entity an encryption request to automatically re-encrypt the second set of elements of data after a particular period of time.

4. The method of claim 3, wherein the decryption information is at least one of (i) time-based information, (ii) location-based information, (iii) hardware profile-based information, or (iv) internet protocol-based information.

5. The method of claim 1, further comprising determining a number of times the second entity has requested access to the second set of elements of data.

6. The method of claim 5, further comprising sending, from the first entity to the user device, the number of times if the number of times exceeds a pre-determined threshold.

7. The method of claim 1 further comprising:
  receiving, at the first entity from the second entity, a first extension request to extend the predetermined amount of time;
  sending, from the first entity to the user device, a second extension request that is based on the first extension request, wherein the second extension request includes a notification to the at least one user for a further affirmation of the first extension request;
  receiving at the first entity from the user device, the further affirmation;
  sending an extension information from the first entity to the second entity to extend the predetermined amount of time.

8. The method of claim 1, further comprising:
sending, from the first entity to the second entity, falsified user data in response to additional requests for the user information by the second entity after receiving the information related to the data breach at the second entity.

9. The method of the claim 1, further comprising initiating, at the first entity, a deletion or destruction of the second set of elements of data located at the second entity based on the information related to the data breach detected.

10. The method of claim 9, further comprising:
receiving, at the first entity from the user device, a deletion request to delete the second set of elements of data stored at the second entity;
sending, from the first entity to the second entity, a further deletion request to automatically delete the second set of elements of data.

11. The method of claim 1, further comprising receiving from the user device a deletion request to delete second set of elements of data at the first entity.

12. The method of claim 1, further comprising receiving, at the first entity from the second entity, a validation request to validate credentials of the second entity.

13. The method of claim 12, further comprising:
validating the credentials of the second entity; and
sending, from the first entity to the second entity, a validation token if the second entity's credentials are valid.

14. The method of claim 1, further comprising:
receive at the first entity updated second set of elements of data related to the at least one user;
encrypting at the first entity the updated second set of elements of data.

15. The method of claim 14, further comprising sending the updated second set of elements of data to the second entity.

16. A non-transitory computer-accessible medium having stored thereon computer-executable instructions for providing encrypted user information, wherein, when a computer arrangement executes the instructions, the computer arrangement is configured to perform procedures comprising:
receiving, at a first entity from a second entity, a validation request to validate credentials of the second entity;
validating, by the first entity, the credentials of the second entity;
sending, from the first entity to the second entity, a validation token if the credentials are valid;
receiving, at the first entity from the second entity, a first request for user information associated with at least one user, wherein the first request includes a user identifier associated with the at least one user, wherein the first entity is different from the second entity; and the user information associated with the at least one user includes a plurality of elements of data having different confidential levels;
sending, from the first entity to the second entity, a first set of elements of data from the plurality of elements of data having a first confidentiality level below a particular confidentiality level:
sending, from the first entity, a second request to a user device associated with the at least one user for a second set of elements of data of the elements of data having a second confidentiality level above the particular confidentiality level, wherein the second request includes a notification to the at least one user to authorize the first request;
receiving at the first entity from the user device, an affirmation for the first request;
in response to the affirmation received, sending, from the first entity to the second entity, the second set of elements of data, the second set of elements of data is encrypted using quantum cryptography, and is automatically deleted after a predetermined amount of time;
receiving, at the first entity from the second entity, a request far a time-limited decryption key;
sending, from the first entity to the second entity, the time-limited decryption key;
monitoring, by the first entity, usage information of the second set of elements of data at the second entity;
detecting, at the first entity, information related to a data breach at the second entity;
sending, by the first entity to the second entity, falsified user data in response to additional requests for the user data from the second entity after the information related to the data breach at the second entity is detected;
sending, by the first entity, a breach notification to the at least one user;
deleting, by the first entity, the second set of elements of data at the second entity based on the information related to the data breach detected.

* * * * *